Nov. 16, 1948.  W. N. LURCOTT  2,454,190
RESISTANCE WELDING APPARATUS AND JIG THEREFOR
Filed Nov. 1, 1946  4 Sheets-Sheet 1
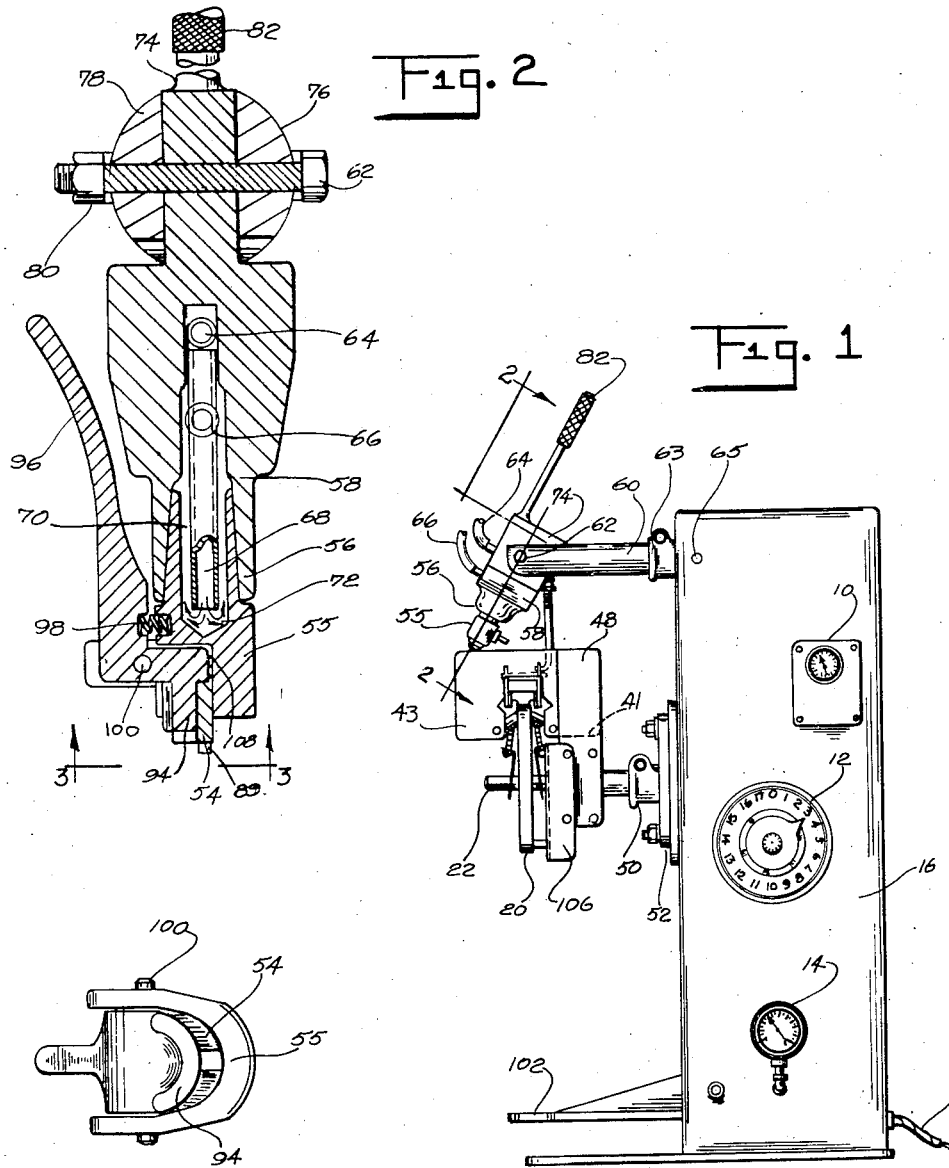
INVENTOR.
WINFRED N. LURCOTT
BY
ATTORNEY

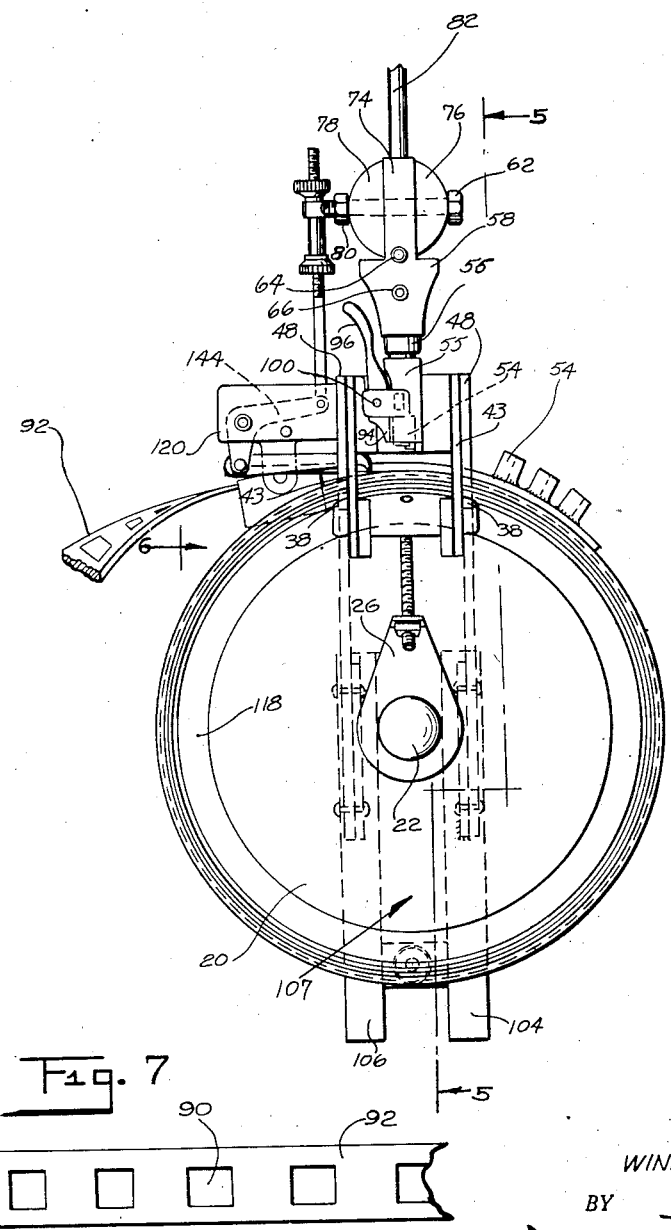

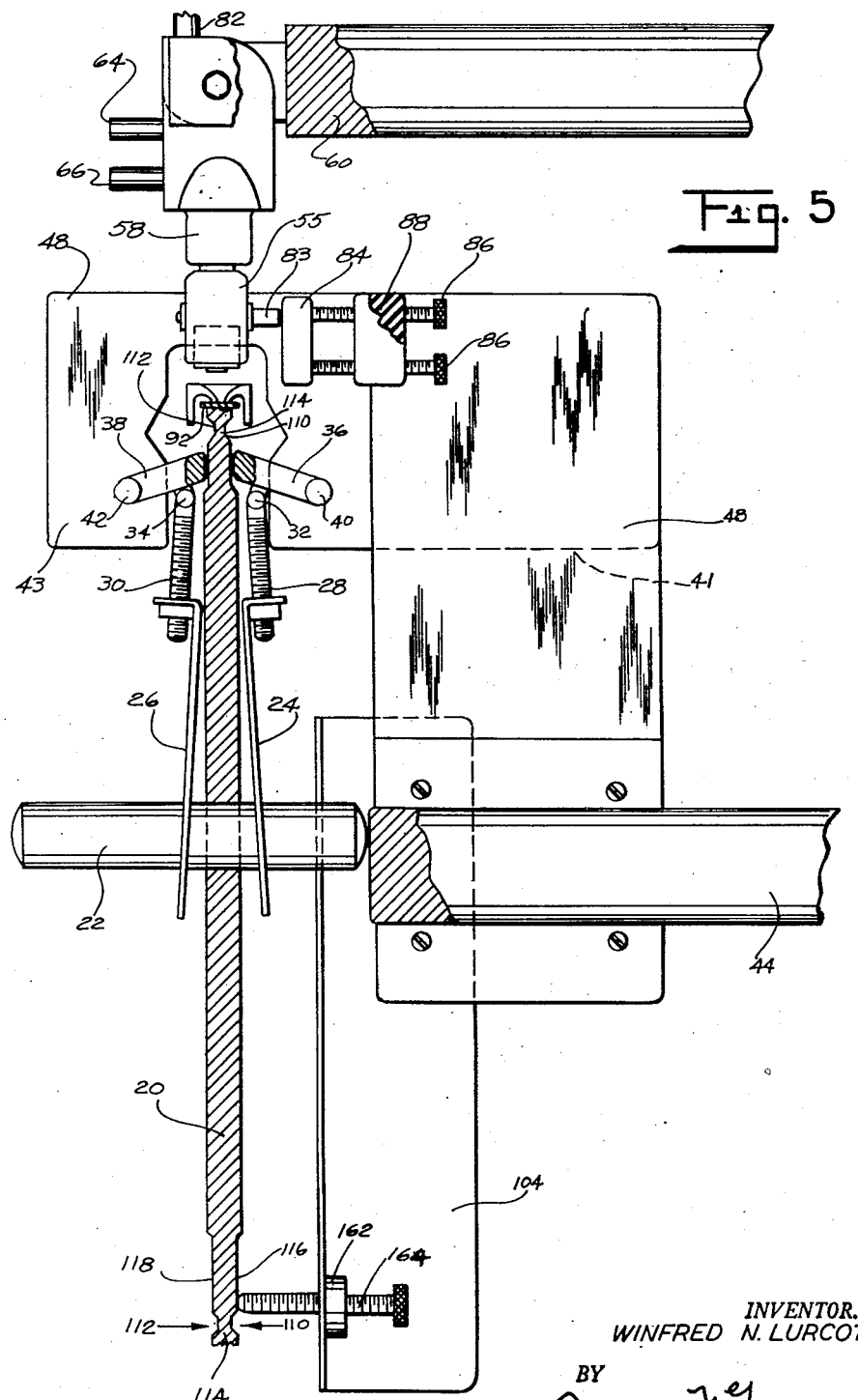

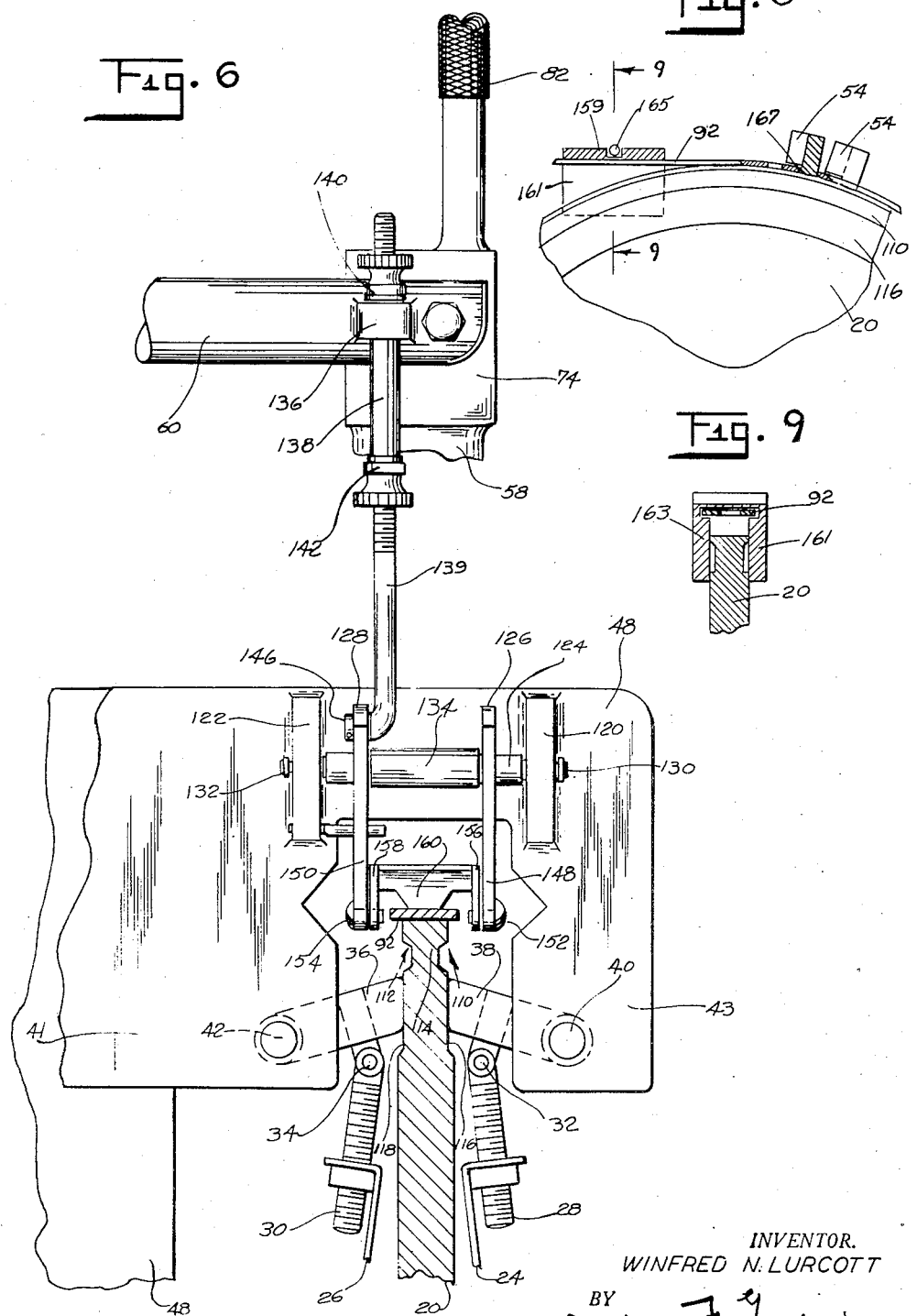

Patented Nov. 16, 1948

2,454,190

UNITED STATES PATENT OFFICE 2,454,190

RESISTANCE WELDING APPARATUS AND JIG THEREFOR

Winfred N. Lurcott, Elizabeth, N. J., assignor to L. J. Wing Mfg. Co., New York, N. Y., a corporation of New York Application November 1, 1946, Serial No. 707,060

21 Claims. (Cl. 219—4)

The present invention relates to a jig that is to be attached to an apparatus for resistance welding, as for example an apparatus in which the buckets are welded to the rotor of a turbine.

The apparatus here concerned with has attached to it a welding jig by means of which the parts to be welded together, for example, the turbine buckets and rotor, are firmly held in the apparatus in the electrical circuit formed with the electrodes thereof so that a positive electrical contact throughout the contacting surfaces of the parts to be welded is effected resulting in the formation of a spot weld not heretofore accomplished with the apparatuses of the prior art.

The present invention further contemplates the provision of a resistance welding apparatus constructed and arranged so that positive welding contact is accomplished by the welding pressure of the members that form the electrical circuit with the bucket and the rotor which are being welded together.

The present invention still further contemplates constructing the rotor so that the heat produced by the electrical resistance is concentrated at the point of weld at which the bucket contacts the periphery of the turbine rotor.

The present invention further contemplates an apparatus by means of which the buckets are automatically spaced at the correct distance from each other around the periphery of the turbine rotor on which a shroud is concurrently mounted.

These and other objects and advantages of the present invention will be clear from the description which follows and the drawings appended thereto in which Fig. 1 is a side elevation of a resistance welding apparatus according to my invention, the operating lever and bucket holder being positioned away from the rotor in non-welding position;

Fig. 2 is a section on the line 2—2 of Fig. 1, to an enlarged scale;

Fig. 3 is a view on the line 3—3 of Fig. 2;

Fig. 4 is a front elevation of a turbine rotor carried in an apparatus according to my invention, illustrating the operating lever and bucket holder in operative position and to an enlarged scale;

Fig. 5 is a view on the line 5—5 of Fig. 4, to a further enlarged scale;

Fig. 6 is a view on the line 6—6 of Fig. 4;

Fig. 7 is a plan view of a shroud used in the practice of my invention, and broken away to condense the drawing;

Fig. 8 is a fragmentary side view of a detail of an apparatus according to my invention;

Fig. 9 is a section on the line 9—9 of Fig. 8.

Referring now to the drawings, my invention is applied to a conventional resistance welding apparatus, having the usual time, current and pressure indicating dial, meter and gauge 10, 12 and 14 and the housing 16 to which a conventional electrical cable 18 leads.

The details of construction of the resistance welding apparatus need not be illustrated for an understanding of my invention as they are well known to the workers in the art and form no part of my invention.

For purposes of an understanding of my invention, I describe it herein as used for welding buckets or blades to the rotor disc of a steam turbine though it will of course be understood that my invention has many other applications.

The turbine rotor 20 is carried on the pin 22, which extends through the bore of the rotor and which pin is carried by the straps 24 and 26. The straps 24 and 26 are threadedly connected to the members 28 and 30 which are pivoted at 32 and 34 to the jaws 36 and 38, which are in turn pivoted at 40 and 42 to the spaced members 41 and 43 extending down from the supporting frame in which the lower electrode 44 is housed.

The jaws 36 and 38 are preferably made from a good electrical conductor, such as copper, so that current from the lower electrode 44 readily circulates through them with a minimum of electrical resistance into the rotor 20, just underneath a groove formed in each face of the rotor and the purpose of which groove will be further described.

The supporting frame 48 may be mounted on the housing 16 in any suitable manner, as by the sleeve 50, which is bolted to the housing 16 as by the plate or collar union 52. The supporting frame 48 and its assembly is thus carried by and is electrically a part of the lower electrode 44, which is housed in the sleeve 50.

The turbine bucket holder 55 is mounted in the lower socket portion 56 of the carrying sleeve 58, which is swingably mounted on the upper electrode 60 by means of the bolt 62, which thereby constitutes a hinge member on which the carrying sleeve 58 is mounted (see Figs. 1, 2 and 6).

The upper electrode 60 is housed in the sleeve 63 extending from and mounted on the housing 16 by means of the pivot pin 65.

The upper electrode is of the conventional type and is movable downwardly (as viewed in Fig. 1) for the welding operation by any conventional means, which since it forms no part of my invention need be illustrated only schematically as by the pivot mounting 65.

In order to keep cool the sleeve member 58, I provide therein the water circulating inlet pipe 64 and outlet pipe 66.

In the interior of the sleeve or socket for the bucket holder 55, I provide the pipe 68, which at its upper end communicates with the inlet pipe 64 and at its lower end with the interior bore 70 into which the outlet pipe 66 extends, thus providing a circulating path for the cooling water as illustrated by the arrows 72 (see Fig. 2).

In order to permit the bucket holder 55 to be swung outwardly, as illustrated in Fig. 1, so that a bucket 54 may be inserted therein, I extend up from the sleeve portion or socket member 58 the apertured hinge portion 74, which is carried on the bolt 62 between the fork arms 76 and 78 of the upper electrode 60.

The bucket holder is swingably mounted on the bolt 62 and frictionally held thereon by means of the nut 80 which is mounted on the threaded end of the bolt 62, which bolt is thus detachably carried on the electrode.

After swinging the bucket holder outwardly away from the rotor 20, the bucket 54, prior to its being welded on the rotor 20 is then inserted into the bucket holder 55 (see Fig. 2), which is then swung inwardly (that is from left to right of Fig. 1) into welding position above the rotor 20 as illustrated in Fig. 5.

Preferably integral with the hinge portion 74 and extending upwardly therefrom, I provide the preferably knurled operating handle 82 by means of which the bucket holder may be swung into and out of operative welding position above the rotor 20.

In order to limit rearward movement (see Fig. 5—from left to right thereof) of the bucket holder and to properly align it above the rotor 20 for the welding operation, I mount the lug 83 on the bucket holder 55, which lug 83 is moved into engagement with the adjustable block or stop member 84, which thereby limits the inward swing of the bucket holder.

The block or stop member 84 is adjustably mounted by means of the threaded, preferably knurled headed bolts 86 on the carrying block 88, made of insulating material, extending from the supporting frame 48. The bolts 86 thus permit the block 84 to be properly positioned so that the jig may be adjusted to different sizes of turbine rotors or buckets.

The adjustable block 84 therefore may be so positioned that it serves to aline the stem 89 of the bucket in position on the rotor disc in the opening 90 in the bottom turbine shroud 92 (see Figs. 4 and 7), which shroud also serves to position the rotor 20 on the pin 22, as I shall further describe, to space the shroud openings to receive the corresponding bucket 54.

When the bucket holder 55 is swung outwardly on the upper electrode 60 (as illustrated in Fig. 1), in order to insert a bucket 54, in the gripping jaw 94 of the bucket holder (see Fig. 2), the lever 96 is manually moved inwardly against the spring 98, to thereby open the jaw 94, which is hinged on the pivot 100 on the bucket holder 55.

The bucket 54 is then inserted in the bucket holder and is held therein upon releasing the lever 96 which permits the spring 98 to close the jaw 94 on the bucket 54 and hold it with a slight grip. After the insertion of the bucket 54, as aforesaid, it is alined with the rotor 20 by swinging the bucket holder 55 into position as described.

The apparatus is now ready to weld the bucket to the rotor and the automatic operation thereof is effected by pressure on the treadle 102, extending from the lower part of the housing 16. This lowers the upper electrode 60, the mechanism for accomplishing which is conventional, and the bucket holder carried by it so that the bucket 54 is thereby brought into contact with the rotor 20 through the corresponding perforation 90 in the shroud 92.

When the welding pressure, which is about two hundred and fifty pounds and which may be indicated by the gauge 14, is reached, current effecting a pre-determined heat as determined by the meter 10 is turned on for a predetermined time as determined by the dial 12.

The welding pressure, as stated, moves the upper electrode 60 and the bucket carrier 54 downward so that the stem of the bucket is pressed downward and held against the peripheral surface of the rotor disc as the welding current is circulated through the bucket and the rotor disc.

Two opposed spaced members 104 and 106 are mounted on the supporting frame 48 and form a groove 107 between them which limits sidewise movement of the pin 22, on which the rotor 20 is carried but concurrently permits vertical movement of the entire assembly.

To recapitulate, the pivots 40 and 42 of the copper jaws 36 and 38 are mounted in the stationary frame 48. These copper jaws, as pointed out, are hingedly connected by the pivots 32 and 34 to the threaded members 28 and 30, which members adjustably carry the straps 24 and 26 through which the pin 22 extends.

Thus, the downward welding pressure and movement is then transmitted through the pin 22, the straps 24 and 26 to the threaded members 28 and 30. The downward movement of the members 28 and 30 rotate the copper jaws 36 and 38 about their pivots 40 and 42 to thereby grip the rotor between them thereby effecting an exceptionally good electrical welding contact near the periphery of the rotor.

As the welding pressure forces the bucket 54 against the rotor disc 20, the bucket 54 has an upward pressure against the shoulder or abutment 108 of the jaw 94 (see Fig. 2). Due to the offset position of the pivot 100, there is exerted by the jaw 94 an additional grip on the bucket, thereby effecting an excellent contact thereon for welding.

By the construction just described an electric circuit is completed through the upper electrode 60, the bucket 54, rotor 20, the copper jaws 36 and 38 and the lower electrode 44, the bucket 54 being thus held in good welding contact in the bucket holder 55 and the rotor 20 in good welding contact with the jaws 36 and 38.

In order to concentrate the heat produced by the resistance to the flow of electrical current at the welding point on the periphery of the rotor, I preferably provide in each face of the rotor 20, just underneath its periphery and above the point of contact of the rotor with the jaws 36 and 38, the grooves 110 and 112. There is thus formed a reduced section of metal 114 in the rotor 20 which resists the flow of heat into the rotor from the point of weld into the body of the rotor thereby concentrating it at the point of contact of the bucket stem with the peripheral surface of the rotor.

In order to provide a positioning contact surface for the jaws 36 and 38, I preferably undercut each rotor face at 116 and 118 (see Fig. 5).

Upon completion of the welding operation (that is when current effecting a predetermined heat has been turned on for the preselected duration), the treadle 102 is released by the operator, thereby returning the upper electrode 60 to its upper normal position, as illustrated in Fig. 1, in the conventional manner.

Movement upwardly of the upper electrode 60, slides the bucket holder 55 off the bucket 54, which has just been welded to the rotor 20, the shoulder 108 of the jaw 94 being raised from the bucket 54. The expanding spring 98, as the bucket holder is being raised, causes the handle 96 and the jaw 94 to rotate into normal position about the pivot 100.

I shall now describe the mechanism by means of which the rotor and shroud are automatically spaced so that each opening 90 on the shroud 92 is positioned underneath the bucket holder 55 to receive therein the stem of a bucket 54 when the treadle 102 is pressed by the operator.

Mounted on the frame 48, I provide the brackets 120 and 122 in which is carried the pivot shaft 124 for the bell cranks 126 and 128. The bellcrank pivot shaft 124 is held in position on the bracket members 120 and 122 as by means of the nuts 130 and 132 and a spacer sleeve 134 is preferably arranged on it between and fastened to the bell cranks 126 and 128. Slidable in the strap member 136, formed on one side of the electrode 60 (see Fig. 6), I provide the insulating sleeve 138. Connected to this insulating sleeve 138, I provide the connecting rod 139, on the threaded upper end of which I mount the upper insulating washer 140 and on the intermediate threaded portion of which I mount the lower insulating washer 142. It will be recognized that the position of the washers 140 and 142 with the insulating sleeve 138 may be selectively adjusted.

The lower end of the connecting rod 139 is pivotally connected to the upper substantially horizontal arm 144 of the bell crank 128 (Fig. 4) and may be held thereon by any suitable means such as the washer 146 (Fig. 6). The lower substantially vertical arms 148 and 150 of the bell cranks 126 and 128 are pivotally connected, as by the rivets 152 and 154 to the side elements 156 and 158 of the pawl 160.

As the upper electrode 60 is moved downwardly, when the operator presses on the treadle 102, the strap member 136 concurrently moves downward to be thereby brought into engagement with the lower washer 142.

This forces the bell crank 128 to be rotated about its pivot shaft 124 in a clockwise direction (as viewed in Fig. 4) thereby moving the pawl 160 to the left (as viewed in Fig. 4) and causing it to drop into the next opening 90 in the shroud 92, the end of the pawl 160 being beveled to permit it to slide to the left over the shroud.

The elements of the mechanism are so dimensioned and positioned relatively to one another that the pawl 160 is received in the next opening 90 as the bucket 54, held in the bucket holder 55, is brought into the corresponding opening underneath it for the welding operation.

Referring now to Figs. 7 and 8, the shroud 92 feeds in at an angle under the pawl 160. In order to center the inside shroud strip 92 with the rotor 20, I provide the guide block 159, the depending sides 161 and 163 of which are held in position by the rotor 29.

A slot is cut in the upper face of the block 159 in which slot the pin 165, supported by the bracket 120, is arranged to keep the guide block in place.

In Fig. 8, one bucket is shown in section and the other bucket is shown in full lines. It is to be noted that the bucket 54 is welded to the rotor at the point of contact 167 of the stem 89 with the periphery of the rotor, where at a depression in the rotor is caused by the welding heat and welding pressure.

On the upward movement of the upper electrode 60, upon completion of the welding operation as heretofore described, the strap member 136 concurrently moves upwardly and engages the upper washer 140 to move the insulating sleeve 138 upwardly.

This movement causes the bell crank 128 to rotate about its pivot shaft 124 in a counterclockwise direction (as viewed in Fig. 4) causing the pawl 160 to move to the right (as viewed in Fig. 4). The bucket holder 55 has already been freed from the bucket 54 which has just been welded to the rotor before the strap member 136 engages the upper washer 140, this being permitted by its spacing from the lower washer 142.

Thus, as the connecting rod 139 is raised and the pawl 160 moved to the right, it pushes the shroud 92, which it will be recognized has been welded to the rotor in advance of the pawl, thus rotating the rotor 20 on the pin 22 a distance equal to that of the spacing between the perforations 90.

Thus, upon completion of the welding cycle, the rotor 20 has been automatically positioned to receive the next bucket for welding, which is inserted into the bucket holder 55 upon rotating it to the left of Fig. 1, as heretofore described.

In order to provide a means for adjustably aligning the rotor disc 20, I preferably provide in the block 162 carried between the members 104 and 106 the adjustable screw 164, one end of which bears against the undercut surface 116.

It will now be recognized that I have provided a jig for a resistance welding apparatus by means of which a firm and excellent welding contact is provided by the welding operation.

While I have shown and described a specific example of my invention, as applied to welding the buckets on a turbine rotor, it will be understood that such example is illustrative only and is not given as a limitation, since other modifications within the spirit and scope of the invention will be apparent to those skilled in the art.

Hence, I do not intend to limit myself thereto but intend to claim my invention as broadly as may be permitted by the state of the prior art and the terms of the appended claims.

I claim:

1. In a resistance welding apparatus having an electrode movable toward a first object to which a second object carried by the electrode is to be welded, a second electrode, a pair of spaced jaws pivoted to the apparatus and electrically connected to the second electrode, said jaws for gripping between them the first object, means for mounting on the first electrode the second object, and strap members, each pivotally connected to a jaw, for supporting thereon the first object.

2. In a resistance welding apparatus for welding buckets to the rotor disc of a turbine, a first electrode movable toward the rotor, means for mounting a bucket on the said first electrode, a pin for mounting thereon the rotor, a second electrode, a pair of spaced jaws pivoted to the apparatus for gripping the rotor between them and electrically connected to the second electrode and means for carrying the pin therein, said pin carrying means connected to the said jaws.

3. In a resistance welding apparatus, a pair of spaced jaws pivotally connected to the apparatus and for gripping between them an object to be welded, said jaws electrically connected in the apparatus to one side of the electric welding circuit, means for supporting the object, said supporting means being mounted on the jaws, and means movable against the object for the welding operation whereby force is exerted against the object, said supporting means, upon exerting force against the object, moving the spaced jaws about their pivots against the object carried by the supporting means to grip it between them.

4. In a resistance welding apparatus for welding buckets to the rotor disc of a turbine, said rotor disc having a bore, a pair of spaced jaws pivoted to the apparatus for gripping the turbine rotor between them, said jaws electrically connected to one side of the electric welding circuit, means for carrying the rotor thereon mounted in the rotor bore and means suspended on the jaws for supporting the first means, a member movable against the rotor for the welding operation to exert force on the rotor, the supporting means, upon exertion of force on the rotor, moving the spaced jaws about their pivots against the rotor.

5. The welding apparatus of claim 4, the suspending means being pivoted to and adjustably arranged on the jaws.

6. The welding apparatus of claim 3, the supporting means being suspended on the jaws and comprising a threaded member pivotally connected to a jaw and an element on which the object is mounted and which element may be selectively positioned on the threaded member.

7. In a resistance welding apparatus for welding buckets to the rotor disc of a turbine, a first electrode, a bucket holder pivotably carried by the first electrode, a second electrode, a frame for housing the second electrode, a pair of jaws movable in the frame for gripping a rotor disc between them, means for carrying a rotor disc between the jaws for movement therebetween and means for suspending the carrying means on the jaws, the first electrode movable toward a rotor disc on the carrying means to bring and press a bucket in the bucket holder against the said rotor disc for the welding operation, said bucket thereby moving the rotor between the jaws to cause the carrying means through the suspending means to move the jaws in the frame against the rotor and thereby grip it.

8. The welding apparatus of claim 7, said suspending means being adjustably mounted on the jaws.

9. In a resistance welding apparatus, a movable electrode, a holding means on the said movable electrode, a second electrode, a housing for said second electrode, a pair of jaws movable in the housing for gripping an object therebetween and electrically connected to the second electrode, means for carrying an object between the jaws, a threaded member pivoted to each jaw and a strap member threadably connected to each threaded member for mounting the object carrying means in the said strap members.

10. In a resistance welding apparatus for welding buckets to a rotor disc of a turbine, which buckets for the welding operation are received in the openings of a shroud, said shroud being secured around the rotor upon welding the buckets thereto, an electrode reciprocable between first and second positions, a bucket carrier thereon and movable with the electrode, said bucket carrier being in bucket holding condition upon reciprocation of the electrode from first to second position, a bucket held in the bucket carrier being received in a first mentioned opening of the openings in the shroud for the welding operation upon reciprocating the electrode to second position, a pawl for engaging openings in the shroud to move it and the rotor to which the shroud is secured into position for receiving a bucket in a second mentioned opening in the shroud for a succeeding welding operation and means operatively connecting the pawl to the electrode, said pawl being movable away from engagement with an opening in the shroud upon reciprocation of the electrode from the first to the second position and being movable into engagement with an opening in the shroud upon movement of the electrode from the second to the first position to thereby move the shroud and rotor from the position in which a bucket has been welded by a prior welding operation into position to receive a bucket for the succeeding welding operation.

11. The apparatus of claim 10, said connecting means comprising a bell crank pivoted to the apparatus.

12. In a resistance welding apparatus for welding the buckets of a turbine to the rotor thereof, means for carrying the rotor in the apparatus for movement of the rotor on its center, a member constituting an electrode for carrying the bucket and reciprocable between a first and second position to bring the bucket onto the rotor for the welding operation, a bell crank pivoted intermediate its ends to the apparatus and pivotally connected at one of its ends to the member and having a pawl at its other end, said pawl engaging the rotor to move it about its center upon movement of the member from one position to the other position and disengaging the rotor upon movement of the member from the latter position to the former position.

13. In a resistance welding apparatus for welding buckets to a rotor disc of a turbine with a perforated shroud therebetween, said shroud having spaced perforations for receiving the stem of a bucket, an electrode movable toward a rotor carried in the apparatus for the welding operation and reciprocable between a first and second position, means on the electrode for carrying a bucket to be welded to the rotor, a member reciprocated by the electrode, a pawl in engagement with the shroud, means for rotatably supporting a rotor in the apparatus and means connecting the pawl to the member, said pawl upon engagement with the shroud through a perforation therein moving the rotor in one direction on the supporting means upon reciprocation of the electrode.

14. The welding apparatus of claim 13, said connecting means comprising a bell crank pivoted in the apparatus.

15. The welding apparatus of claim 13 and including a bucket holder having a mouth normally closed by a pivoted jaw to hold a bucket therebetween, said jaw being in normal mouth closing position upon movement of the electrode toward the rotor and said jaw moved about its pivot into mouth opening position for the release of a bucket upon movement of the electrode away from the rotor.

16. In a welding apparatus for welding the bucket of a turbine to the rotor thereof, means for holding a bucket for the welding operation comprising a member, a gripping jaw pivoted in the holding means, a spring above the pivot and urging the jaw thereabout toward the member for gripping a bucket therebetween, an undercut shoulder on the jaw above a bucket held in the gripping means, said shoulder offset from the gripping jaw pivot whereby said jaw is urged into normal position upon engagement of a bucket by the shoulder.

17. In combination a resistance welding apparatus having a first electrode and a pair of spaced opposed electrodes, said first electrode connected to one side of the electric welding circuit and each of said pair of spaced electrodes connected to the other side of the electric welding circuit, said first electrode engaging a bucket and each of said spaced electrodes contacting an opposite side of the rotor to grip the rotor therebetween, said bucket held in the apparatus to be welded to the peripheral surface of the rotor, said rotor having opposed grooves on the faces thereof to be contacted by the pair of spaced electrode immediately therebelow, said grooves thereby forming a reduced section of metal immediately underneath the point of welding contact between the bucket and first electrode and the peripheral surfaces of the rotor contacted by the spaced electrodes.

18. In combination a resistance welding apparatus having a first electrode and a pair of spaced opposed electrodes, one side of the electric welding circuit connected to the first electrode and the other side of the electric welding circuit connected to the spaced electrodes, a first member and a second member mounted in the apparatus for mutual contact at the point of welding the two members together, the first element having grooves on its opposite faces, a said face immediately below the groove to be engaged by an electrode of the spaced electrodes and the second element in electrical contact with the first electrode, said grooves thereby forming a reduced section of metal underneath the point of welding contact between the first member and the second member.

19. In a resistance welding apparatus for welding a first object to a second object, a first electrode, a holder for one of the objects and carried by the first electrode, a second electrode, a frame for housing the second electrode, means for gripping the other of said objects movably mounted in the housing, means for carrying the other of said objects, and means for suspending the carrying means on the gripping means, the first electrode movable toward the other of said objects in the carrying means to bring the first of said objects against the other of said objects for the welding operation, and exert force against it, the force exerted by said first one of said objects against the other of said objects causing the suspending means to move the gripping means against the other of said objects for gripping it therein.

20. The apparatus of claim 10, said means operatively connecting the pawl to the electrode comprising a sleeve member, means for engaging the sleeve member to reciprocate it between limits upon reciprocation of the electrode between first and second position, said pawl at one end thereof being pivoted to the sleeve member and a finger pivoted to the other end of the pawl for engaging an opening in the shroud.

21. The apparatus of claim 10, said means for operatively connecting the pawl to the electrode including a sleeve member and a means for engaging the sleeve member to reciprocate it between limits upon reciprocation of the electrode between first and second positions, said sleeve being adjustably positioned relative to the engaging means.

WINFRED N. LURCOTT.

REFERENCES CITED

The following references are of record in the file of this patent:

UNITED STATES PATENTS

| Number | Name | Date |
| --- | --- | --- |
| 969,260 | Ferranti | Sept. 6, 1910 |
| 1,895,577 | Little | Jan. 31, 1933 |
| 2,005,752 | Pfanstiehl | June 25, 1935 |
| 2,174,801 | Meyer | Oct. 3, 1939 |
| 2,260,928 | Bixby | Oct. 28, 1941 |